June 21, 1932.   J. N. HELTZEL   1,863,846
JOINT MEMBER AND REENFORCING ROD SUPPORT
Filed Nov. 12, 1928   3 Sheets-Sheet 1

Inventor:
John N. Heltzel
By Monica E. Miller
Attorney.

June 21, 1932. J. N. HELTZEL 1,863,846
JOINT MEMBER AND REENFORCING ROD SUPPORT
Filed Nov. 12, 1928 3 Sheets-Sheet 2
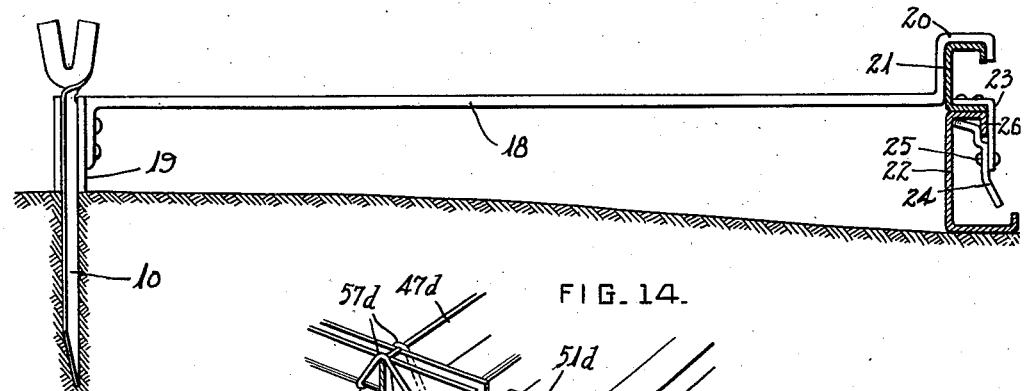
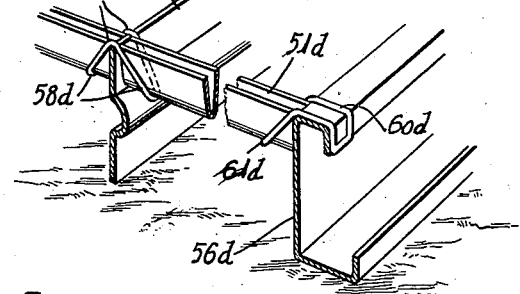
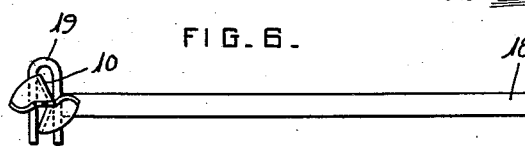
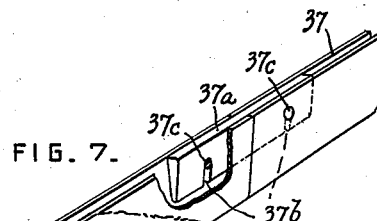
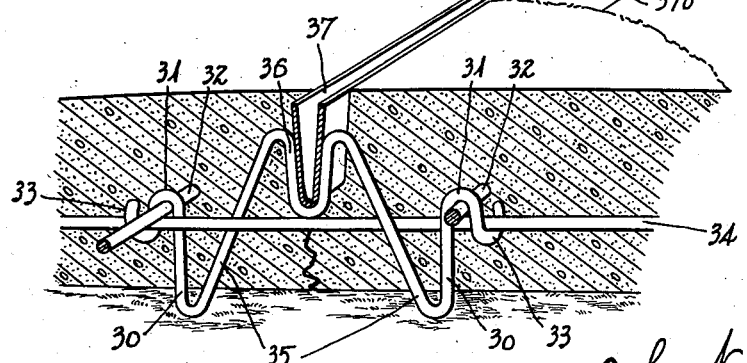

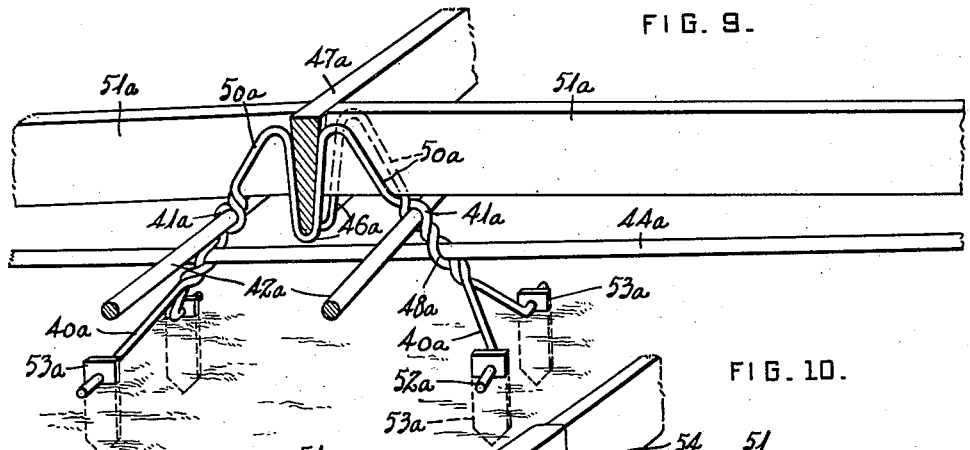
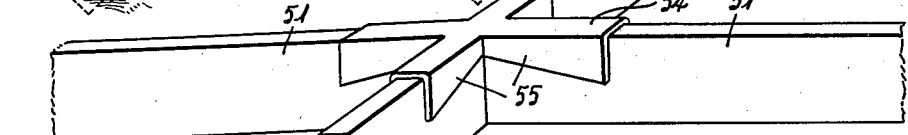
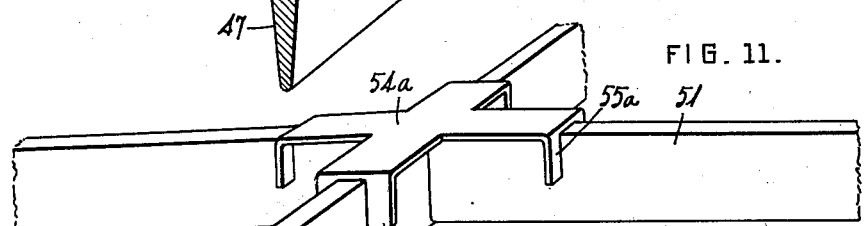
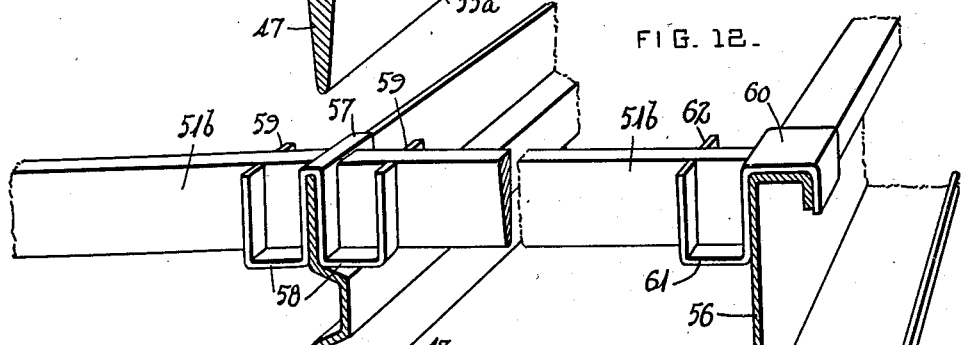
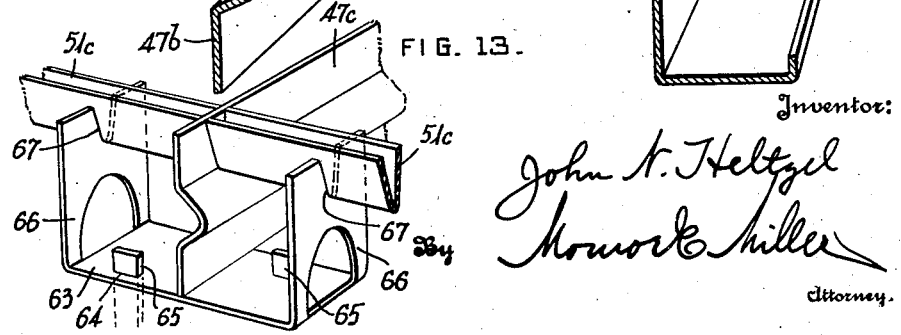

Patented June 21, 1932

1,863,846

UNITED STATES PATENT OFFICE

JOHN N. HELTZEL, OF WARREN, OHIO

JOINT MEMBER AND REENFORCING ROD SUPPORT

Application filed November 12, 1928. Serial No. 318,919.

The present invention relates to devices used in building concrete roads and other surfacing structures, and aims to provide novel and improved means for supporting joint forms or members and reenforcing rods.

Another object is the provision of a simple and inexpensive support which may accommodate both longitudinal and transverse joint forms or members, and which may also support both longitudinal and transverse reenforcing rods.

Another object is to provide a support for a joint form or member which will permit a hinge action of the slabs at the opposite sides of the joint without subjecting the joint portions of the slabs to injurious or destructive strains or stresses.

A further object is the provision of means for holding transverse joint forms or members in alinement at opposite sides of a longitudinal joint form or member.

A further object is the provision of a novel device for positioning or "spotting" the supporting member in the line of the joint.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 5 is an elevation of the stake spotter, showing the stake in elevation, and the form rails in cross-section.

Fig. 6 is a plan view of the parts shown in Fig. 5.

Fig. 7 is a perspective view illustrating a modified form of supporting member and a joint form coupling.

Fig. 9 is a perspective view of a supporting member constructed from wire for holding both longitudinal and transverse joint forms or members and reenforcing rods.

Figs. 10 and 11 are perspective views of cap plates for holding the transverse joint forms or members in alinement.

Fig. 12 is a perspective view illustrating means for supporting transverse joint forms or members from the side rails or forms and longitudinal division plate.

Fig. 13 is a perspective view of another modification.

Fig. 14 is a perspective view of still another modification.

Figure 1:
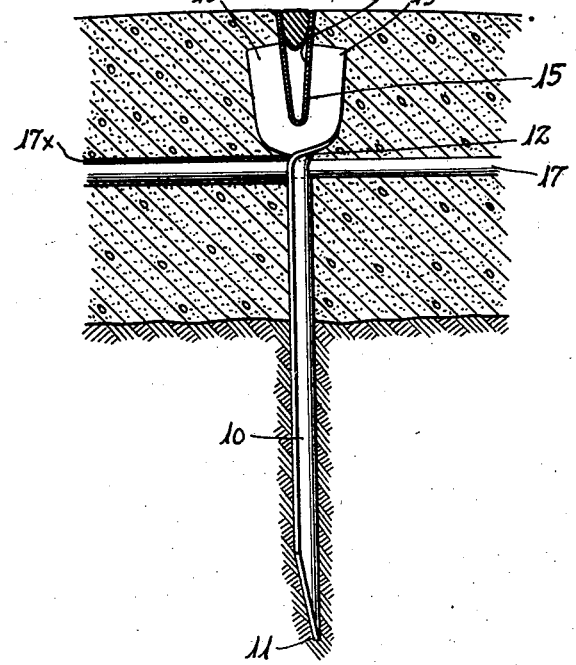
Figure 1 is an elevation of the improvements embodied in a stake, showing the joint form or member and a portion of the road in cross section.
Figure 2:
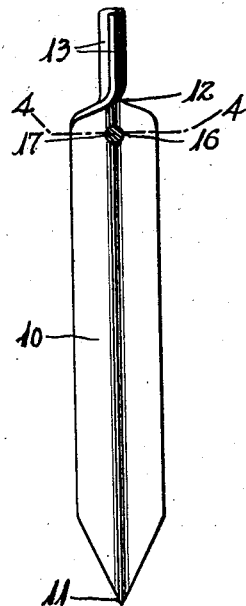
Fig. 2 is an elevation of the stake, looking at right angles to the line of view in Fig. 1.
Figure 3:
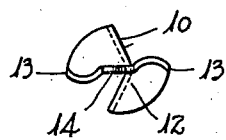
Fig. 3 is an upper end view of the stake.
Figure 4:
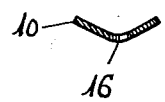
Fig. 4 is a section on the line 4—4 of Fig. 2.

As shown in Figs. 1, 2, 3 and 4 the supporting member comprises a stake 10, which is pressed from suitable sheet metal, and the stake is bent along a longitudinal line between its edges, so as to be of obtuse-angle cross section, as seen in Fig. 4. The stake is therefore stiff, and is prevented from tilting edgewise when driven into the ground or sub-base.

The lower end of the stake is pointed, as at 11, and the stake is formed near its upper end with a twist 12. The upper end portion of the stake is bifurcated above the twist 12, the upper end portion of the stake being split to form the arms 13 which are separated so as to provide a slot or recess 14 adapted to receive and support the joint form or member 15. The twist 12 extends through an angle of 90 degrees, as shown, so that the arms 13 are disposed in a vertical plane substantially at right angles with the plane of the body of the stake below the twist 12. The arms 13 are of arcuate cross-section, so as to stiffen them, and to resist bending when the stake is driven into the ground.

The stake 10 has an aperture 16 immediately below the twist 12 to receive a transverse reenforcing rod or dowel 17, so that the stake may support said rod as well as the form or member 15.

The stakes are driven into the ground or sub-base along the line of the joint, and the reenforcing rods or dowels 17 are inserted through the apertures 16. The joint forms or members 15 are seated in the slots or recesses 14. The joint forms or members and rods 17 are thus supported by the stakes during the pouring and finishing of the concrete, and the joint forms or members may be positioned accurately along the desired line. As shown, the joint form or member constitutes a division plate of V-shaped cross-section, which may be removed after the concrete has set, to provide a groove or channel in the road, which defines the line of the break of the concrete after it has set.

In order to position the stakes, a stake spotter is used, as seen in Figs. 5 and 6. This device comprises a bar 18 of suitable length, which may be made adjustable if desired, and which has at its inner end a U-shaped stake guid 19 to receive the stake and guide it into the ground. The outer end of the bar 18 is formed with a raised hook 20 to engage over a form rail 21 seated on a form rail 22, which define one side of the road.

The stakes are thus conveniently driven into the sub-base at a predetermined distance from the form rails at one side of the road.

In order to detachably fasten the form rail 21 on the rail 22, an angular bracket or hanger 23 is riveted or otherwise secured on the lower flange of the rail 21, and a cam latch 24 is pivoted, as at 25, between its ends to the hanger 23. The upper arm of the latch 24 is adapted to engage behind the depending lip or flange 26 of the tread of the rail 22 and has a rounded end to seat in the corner between the web and tread of the rail 22. Thus, when the rail 21 is placed on the rail 22 the latch 24 is swung and driven into place by a hammer or other implement with a cam action under the tread of the rail 22, so as to securely hold the rail in place.

The spotter shown in Figs. 5 and 6 corresponds with that shown in Fig. 12 of my copending application Serial No. 718,376, filed June 6, 1924, and in this respect this application is a continuation of said copending application.

When using the stakes for supporting forms for the production of transverse contraction joints in a road, a sleeve 17x of paper, metal or other suitable material may be slipped on each dowel 17 at one side of the stake with its inner end abutting said stake. This will position the sleeve with its inner end immediately below the groove in the road so as to coincide with the break or joint. The dowel 17 will therefore be free to slide in the sleeve in the expansion and contraction of the road.

Fig. 7 illustrate a supporting member bent from a rod and constituting a chair for reenforcing rods and a joint form or member.

This supporting member embodies some of the features of and improvements in the reenforcing rod chair disclosed in my copending application Serial No. 189,544, filed May 7, 1927. The rod is bent to provide the supporting portions 30 which have hooks 31 at their upper ends to engage over the longitudinal reenforcing rods 32 disposed at opposite sides of the line of the joint, and from the hooks 31 the terminals of the rod are bent into hooks 33 to engage in opposite directions under the transverse reenforcing rod or dowel 34 that extends below the rods 32, as disclosed in application Serial No. 189,544. The rod has upwardly converging inclined portions 35, and has a depending V-shaped slotted seat 36 connecting the upper ends of the portions 35 to support the joint form or member 37.

It will be noted that the chair, where it extends across the joint between the slabs, is U-shaped, and the slabs are broken and disconnected below the transverse reenforcing or tie rods 34, so that the slabs may have hinge actions due to the pressure of vehicles passing thereover, without subjecting the portions of the slabs along the joint to injurious or destructive strains or stresses, which are apt to fracture the concrete.

Fig. 7 also illustrates how the joint forms 37, comprising resilient plates doubled on a longitudinal median line, are coupled end to end. Thus, a coupling bar 37a is disposed between the edges of the forms 37 to extend across the line of the abutting ends thereof, and said bar has downwardly opening slots 37b engaging transverse rivets or pins 37c secured loosely to the forms 37. The bar 37a thus couples or connects the forms 37 to prevent endwise separation thereof and to keep said forms in alinement. Either end of the bar 37a may be swung upwardly, to conveniently remove the bar, and the rivets 37b are preferably loose to permit the sides of the forms to be sprung together for removing the forms from the concrete after it has set.

Fig. 7 also depicts how the wire supporting members may be used for supporting wire reenforcement above the sub-base of a road, with the joint form or member also supported by said supporting members above the reenforcement. The supporting members may be positioned at longitudinally spaced points and engaged with longitudinal and transverse rods of the reenforcement, as represented by the rods 32 and 34 in Fig. 7, and said members resting on the sub-base will support the reenforcement at the desired distance above the sub-base. The joint forms or members may then be placed in the loops 36 so as to be held in position on the reenforcement.

Figure 8:
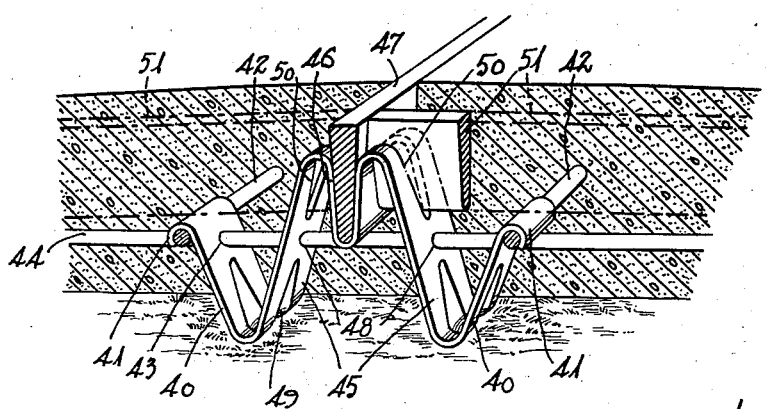
Fig. 8 is a perspective view of another modification in the supporting member which accommodates both longitudinal and transverse joint forms or members and reenforcing rods.

Fig. 8 illustrates a chair corresponding to that shown in Fig. 7, but made from a strip of sheet metal, which has the upwardly extending portions 40 having their upper terminals bent into hooks 41 to engage over the longitudinal reenforcing rods 42, and said portions 40 have apertures 43 to receive the transverse reenforcing rod or dowel 44 below the rods 42.

The strip has the upwardly converging inclined portions 45 connected at their upper ends by the slotted V-shaped seat 46 in which the joint form or member 47 is seated. As shown, the form or member 47 is a solid bar. The portions 45 have apertures 48 to receive the rod 44, and the strip is formed with pressed ribs 49 extending across the bends between the portions 40 and 45, to strengthen the chair or support.

The chair is provided with slots 50 extending downwardly from the bends between the portions 45 and 46, to receive the adjacent ends of transverse joint forms or members 51, thereby holding said forms or members 51 in alinement and supporting the adjacent ends thereof in abutment with the form or member 47.

The slots of the supporting members may be made of various sizes and shapes to receive joint forms or members of different kinds.

The members 51 are not used when the rod 44 is used, and when the members 51 are used the rod 44 is omitted, and the portions 41 are bent under the rods 42 to support them.

Fig. 9 illustrates a support for substantially the same purpose as the support shown in Fig. 8, excepting that the support is made from wire.

The wire chair has a pair of U-shaped or V-shaped seats 46a for the joint form or member 47a, from which the inclined portions 50a extend downwardly to provide slots or seats to receive the adjacent terminals of the transverse joint forms or members 51a. The chair has diverging legs 40a with feet 52a extending away from one another to rest on the sub-base, or the chair may be supported above the sub-base by engaging the feet 52a through apertures in stakes 53a driven into the sub-base, as seen in Fig. 9.

The wire is twisted between the portions 50a and legs 40a to provide eyes 41a to receive the longitudinal reenforcing rods 42a, and eyes 48a to receive the transverse reenforcing or tie rod 44a.

Fig. 10 illustrates a cap plate 54 which is X-shaped to rest on the upper edges of the longitudinal and transverse joint forms or members 47 and 51. The plate 54 has depending flanges 55 along its edges to overlap the sides of the forms or members, so that the plate will hold its position on the form or member 47 and will hold the forms or members 51 in alinement. This cap plate may be used over the joint forms or members supported by the chairs shown in Figs. 8 and 9.

Fig. 11 illustrates a modification in the cap plate 54a which has downwardly bent slotted terminal portions 55a disposed astride the joint forms or members.

Fig. 12 illustrates means for supporting the transverse joint forms or members 51b from and between the longitudinal division plate 47b and the side rails or forms 56.

An inverted sheet metal saddle 57 is disposed astride the upper edge portion of the division plate 47b and has outstanding stirrups 58 at opposite sides to support the adjacent ends of the forms or members 51b, and said stirrups have upstanding slotted portions 59 receiving said forms or members to hold them in alinement.

The outer end of each form or member 51b is supported by a saddle 60 engaging over the tread of the rail 56 and having a stirrup 61 on which the form or member 51b is seated. Said stirrup has an upstanding slotted portion 62 receiving the form or member to hold it in place.

The saddles or hangers as well as the transverse forms or members may be left in place or removed, depending on the circumstances. The saddles or hangers may also be of different formations for accommodating different transverse joint forms or members.

Fig. 13 illustrates another variation including a base plate 63 having the upstanding pedestal portions 66 disposed at the opposite sides of the longitudinal division plate 47c and provided with notches or slots 67 to receive and support the transverse forms or members 51c with their adjacent ends abutting the plate 47c. The base plate 63 has slots 64 to receive stakes 65 driven into the ground to hold the plate 63 in position.

Fig. 14 illustrates still another modification including a wire saddle 57d adapted to seat on the upper edge of the longitudinal division plate 47d astride said plate, and having the downwardly diverging loops or stirrups 58d in which the inner ends of the transverse forms or members 51d are seated. The outer ends of the forms or members 51d are seated in the loops 61d of wire saddles 60d that are fitted astride the form rails 56d at the opposite sides of the road. These wire saddles may be withdrawn from the concrete, before it has set, as well as the forms or members 51d.

Having thus described the invention, what is claimed as new is:—

1. A supporting member having means for receiving and supporting a joint member and having means for supporting a reenforcing rod at an angle to said member.

2. A supporting member having means for receiving and supporting a joint member and having means for supporting a reenforcing rod disposed below and at an angle to said joint member.

3. A supporting member having a slot for receiving and supporting a joint member and having means below the slot for supporting a reenforcing rod at an angle to said member.

4. A supporting member having a slot to receive a joint member and having an aperture below said slot for receiving a reenforcing rod arranged at an angle to said member.

5. A supporting device having means for receiving and supporting longitudinal and transverse joint members and means for receiving and supporting longitudinal and transverse reenforcing rods below the upper edges of said members.

6. A supporting member bent from a single length of material and having portions and a U-shaped portion connecting them and adapted to receive a joint member, the firstnamed portions having slots to receive the adjacent terminals of joint members at opposite sides of the firstnamed joint member.

7. A supporting member bent to provide opposite portions and a U-shaped portion between the upper ends thereof, with bends between the firstnamed portions and U-shaped portion, said U-shaped portion being adapted to receive a joint member, and the firstnamed portions having slots extending downwardly from said bends to receive the adjacent terminals of other joint members.

8. A supporting member comprising a single length of material bent to provide a U-shaped portion adapted to receive a joint member, and to provide opposite side portions connected by said U-shaped portion, said side portions having means to receive the adjacent terminals of joint members at opposite sides of the firstnamed joint member.

9. A supporting member comprising a single length of material bent to provide a U-shaped portion adapted to receive a joint member, and to provide opposite side portions connected by said U-shaped portion, said side portions having means to receive the adjacent terminals of joint members at opposite sides of the firstnamed joint member, and said member having portions extending upwardly from the lower ends of said side portions and formed with means for supporting reenforcing rods.

In testimony whereof I hereunto affix my signature.

JOHN N. HELTZEL.